United States Patent
Min

(10) Patent No.: US 6,817,709 B2
(45) Date of Patent: *Nov. 16, 2004

(54) VENTILATED GLASSES WITH A REMOVABLE PAD

(75) Inventor: Kyung H. Min, Seoul (KR)

(73) Assignee: KBC America Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/732,356

(22) Filed: Dec. 11, 2003

(65) Prior Publication Data

US 2004/0119936 A1 Jun. 24, 2004

Related U.S. Application Data

(63) Continuation of application No. 09/992,361, filed on Nov. 19, 2001.

(30) Foreign Application Priority Data

Jul. 26, 2001 (KR) .......................... 2001-22673

(51) Int. Cl.[7] .............................. G02C 11/08
(52) U.S. Cl. ............................. 351/62; 351/138; 2/235; 2/236
(58) Field of Search .................... 351/62, 41, 136–139; 2/435, 436, 437

(56) References Cited

U.S. PATENT DOCUMENTS

| | | |
|---|---|---|
| 4,785,481 A | 11/1988 | Palmer, III et al. |
| 4,934,807 A | 6/1990 | Bolle et al. |
| 5,300,963 A | 4/1994 | Tanaka |
| 5,388,269 A | 2/1995 | Griffin |
| 5,548,351 A | 8/1996 | Hirschman |
| 5,614,963 A | 3/1997 | Parker |
| 5,898,468 A | 4/1999 | Mage |
| 6,062,688 A | 5/2000 | Vinas |
| D428,913 S | 8/2000 | Kopfer |
| 6,233,342 B1 | 5/2001 | Fernandez |

*Primary Examiner*—Hung Xuan Dang
(74) *Attorney, Agent, or Firm*—Miles & Stockbridge P.C.; Edward J. Kondracki

(57) ABSTRACT

The ventilated glasses system with a removable pad and detent includes an eyeglass frame and an inner frame with the pad. The first aperture and the second aperture are located on the nostril bridge support, where condensation tends to be the most prevalent. Air can flow from the exterior surface to the interior surface through the first aperture and the second aperture. Detents securely attach the inner frame to the eyeglass frame.

17 Claims, 3 Drawing Sheets

VENTILATED GLASSES WITH A REMOVABLE PAD

CROSS REFERENCE

This application is a continuation of application Ser. No. 09/992,361, filed Nov. 19, 2001, and a co-parent application of Ser. No. 10/608,123 filed Jun. 30, 2003, which, in turn, is a continuation-in-part of the aforenoted application Ser. No. 09/992,361 filed Nov. 19, 2001.

CLAIMING FOREIGN PRIORITY

The applicant claims and requests a foreign priority, through the Paris Convention for the Protection of Industrial Property, based on a patent application filed in the Republic of Korea (South Korea) with the filing date of Jul. 26, 2001, with the application number 2001-22673, by the applicant. (See the Attached Declaration)

BACKGROUND

The present invention relates to sunglasses. More particularly the present invention pertains to sunglasses that are worn by riders of motorcycles, bicycles, and other vehicles who experience strong winds blowing upon their face.

Some of the presently available glasses have various types of added protection around the perimeter edge of the glasses that reduce the wind blowing upon the rider's face. Unfortunately this extra protection on the glasses reduces the amount of air circulation on the back interior surface of the glasses near the face. The reduced air circulation allows moisture to build up, which causes condensation and fogging on the back interior surface of the glasses. The condensation and fogging reduces the visibility of the rider. Bicycles and motorcycles can travel at relatively high speeds where adequate visibility is a great safety concern.

Devices, such as ski goggles, are designed to reduce wind effects upon the eyes and minimize the condensation buildup. Ski goggles are often made with an inner lens and an exterior lens that create a substantially enclosed chamber. The air in the chamber is warmed by the proximity to the face. The higher air temperature of the chamber in relation to the outside ambient temperature assists in reducing condensation buildup. Unfortunately, ski goggles tend to be too bulky for riders of cycles. Furthermore, the ski goggles are not an aesthetically appealing design shape for bicycle and motorcycle riders.

Therefore there is a need for sunglasses that have added protection around the edges of the glasses, which reduce the wind blowing upon the rider's face. Furthermore, the glasses should also have a source for reducing the condensation and fogging on the back interior surface of the glasses. The glasses should be lightweight and comfortable for the rider, while creating an appealing aesthetic image.

SUMMARY

An objective of the present invention is reducing the airflow impacting the rider's eyes. Motorcycles, bicycles, and other vehicles can travel at high speed, which creates significant airflow around the glasses into the eyes. The strong airflow around the perimeter of the eyes can cause significant watering of the eyes, which reduces visibility and affects safety. An advantage of the liner pad is improved vision and comfort for the rider, due to the reduction in airflow impacting the eyes.

Another objective is providing adequate airflow through the glasses to counteract the build up of condensation upon the interior surface of the eyeglass frame. The reduction of wind from around the perimeter of the glasses that contacts the interior surface must be compensated in some manner, in order to reduce condensation accumulation. Traveling on motorcycles and bicycles can be a strenuous activity. Perspiration often accumulates on the rider's face, which vaporizes and collects on the glasses as condensation. Apertures are provided that allow a reduced airflow onto the interior surface. An advantage of the apertures is the reduction in condensation build up, which improves visibility and safety.

A further objective is easy attachment and removal of the protective liner pad from the eyeglass frame. Easily switching from just basic glasses to a ventilated glasses system with the pad is an important advantage. Removal of the inner frame and liner pad decreases the weight of the glasses, which increase comfort. Also, some people consider the glasses more aesthetically appealing with the inner frame and pad removed. Detents are provided thus the inner frame with the protective pad is quickly reattached to the eyeglass frame when travel begins on the cycle. The detents are advantageous as they save time and frustration, while providing a quick method of attaching and detaching the inner frame from the eyeglass frame.

The ventilated glasses system includes a pad that serves as a liner for the inner frame. The pad reduces the air flowing into the eyes from around the perimeter edge of the glasses. A cavity with a partial air seal is formed by the person's face and the ventilated glasses system with pad. The partial air seal prevents any significant amount of airflow around the perimeter edges of the eyeglass frame. This lack of airflow could cause an accumulation of moisture and condensation within the cavity. Without adequate ventilation the condensation accumulates on the interior surface of the left lens and right lens, which obscures vision.

Apertures that form small holes are added to the eyeglass frame system to increase the airflow, thus reducing the condensation. The apertures are small enough to minimize the strength and speed of the airflow, yet still sufficient in size to allow a volume of air to flow through that will remove condensation from the interior surface.

An embodiment of the ventilated glasses system with a removable pad and detent includes an eyeglass frame with an exterior surface and an interior surface. The eyeglass frame has a left ear extension, a right ear extension, and a nostril bridge support. The first aperture and the second aperture are located on the nostril bridge support, where condensation tends to be the most prevalent. Air can flow from the exterior surface to the interior surface through the first aperture and the second aperture.

The left lens and the right lens are attached to the eyeglass frame. The left lens and the right lens form a portion of the interior surface. Air flowing through the first aperture and the second aperture removes condensation from the interior surface, which dries the left lens and the right lens.

An inner frame is attached to the eyeglass frame with a detent. The detent includes a male portion and a female portion that accepts the male portion. The detent firmly secures the inner frame to the eyeglass frame. The inner frame has a pad that significantly reduces the wind from blowing on a person's eyes, while wearing the glasses. The pad is positioned on the back surface of the inner frame, so that the pad can compress against the person's face. The pad has a thickness 't' that is about one-quarter (0.25) inch.

The inner frame contains a first track and a second track. The eyeglass frame has an associated first ridge and second ridge. The first track guides the first ridge and the second track guides the second ridge. The inner frame is guided into the proper alignment for attachment to the eyeglass frame.

The eyeglass frame has a third aperture and a fourth aperture, which are similar in function to the first aperture and the second aperture. Air can flow through the third aperture and the fourth aperture thus removing condensation from the interior surface. The third aperture is located adjacent to the right ear extension and the fourth aperture is located adjacent to the left ear extension.

Although the present invention is briefly summarized, a fuller understanding of the invention can be obtained from the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
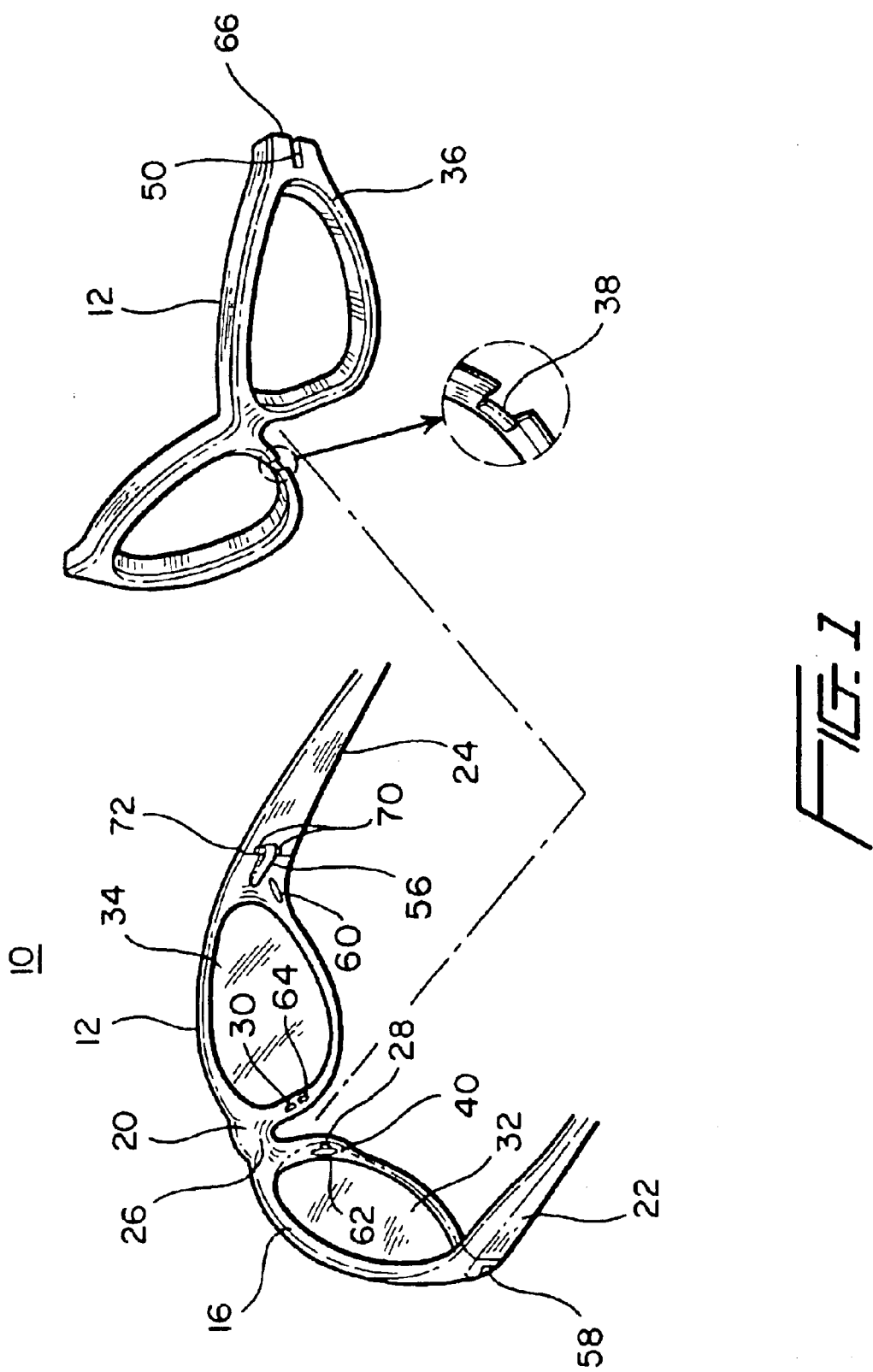
FIG. 1 is an exploded perspective view of the eyeglass frame and inner frame.
Figure 6:
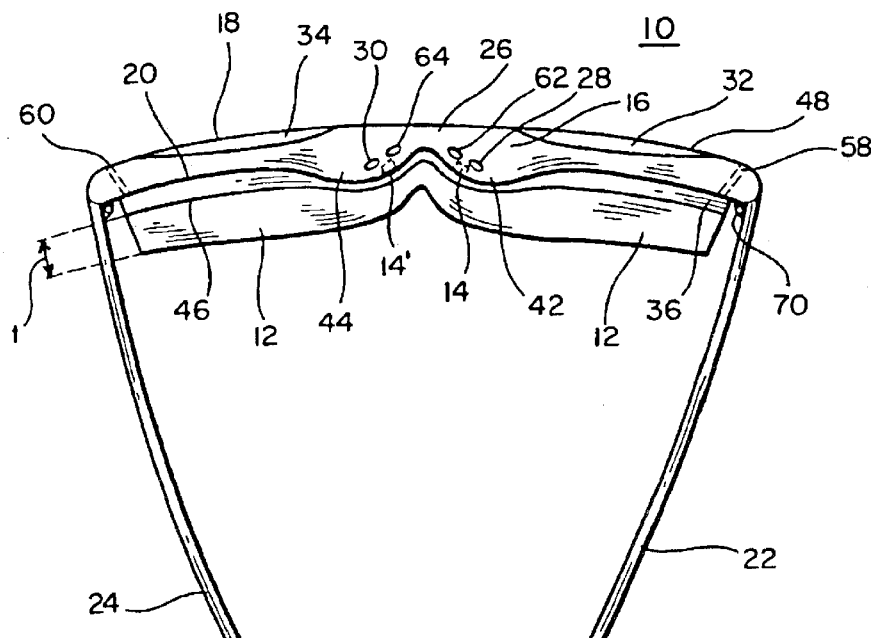
FIG. 6 is a bottom view with the inner frame attached to the eyeglass frame.

Referring to FIGS. 1 through 6, with particular reference to FIGS. 1 and 6, a ventilated glasses system 10 with a removable pad 12 and detent 14 includes an eyeglass frame 16 with an exterior surface 18 and an interior surface 20. The eyeglass frame 16 has a left ear extension 22, a right ear extension 24, and a nostril bridge support 26. The first aperture 28 and the second aperture 30 are located on the nostril bridge support 26, where condensation tends to be the most prevalent. Air can flow from the exterior surface 18 to the interior surface 20 through the first aperture 28 and the second aperture 30.

The left lens 32 and the right lens 34 are attached to the eyeglass frame 16. The left lens 32 and the right lens 34 forms a portion of the interior surface 20. Air flowing through the first aperture 28 and the second aperture 30 removes condensation from the interior surface 20, which dries the left lens 32 and the right lens 34.

An inner frame 36 is attached to the eyeglass frame 16 with a detent 14. Two detents 14, 14' are provided for a firm attachment, shown in dotted lines on FIG. 6. The detents 14, 14' provide a quick and effective mechanism for attaching and removing the inner frame 36 from the eyeglass frame 16.

Figure 4:
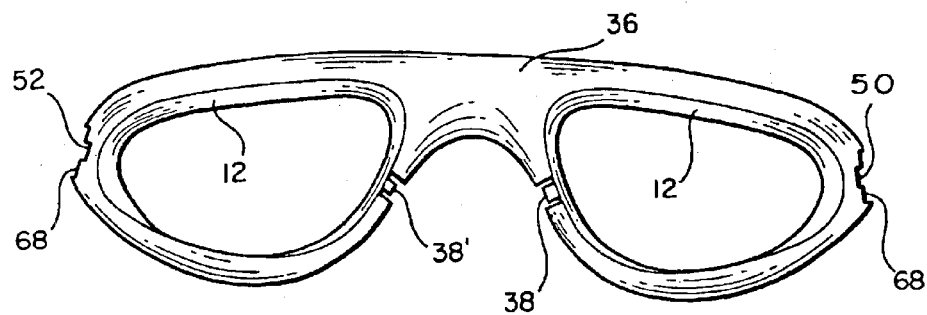
FIG. 4 is front view of the inner frame.
Figure 5:
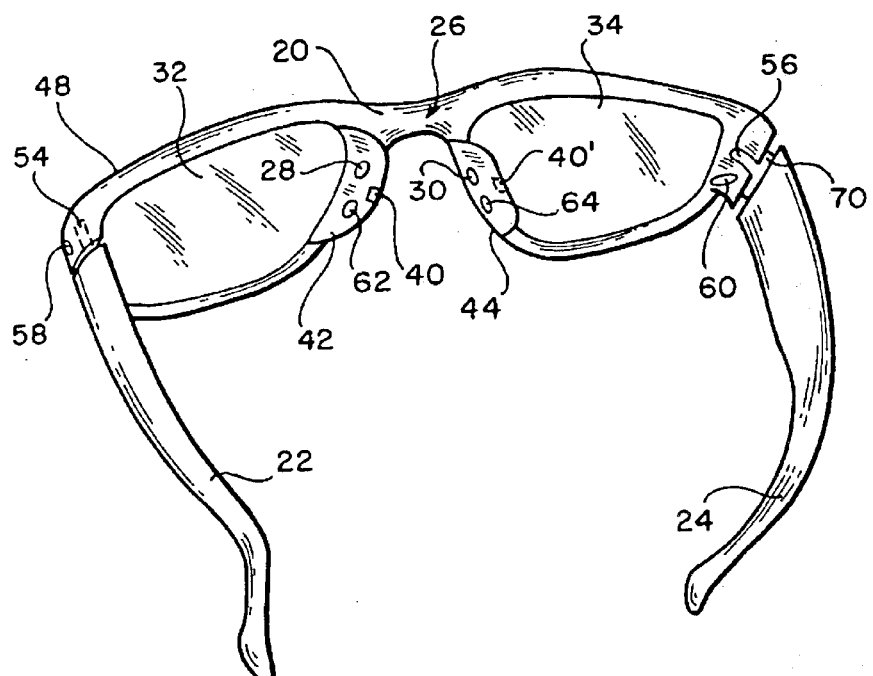
FIG. 5 is a back-side perspective view.

Referring to FIGS. 4 and 5, the detents 14, 14' include a male portion 38, 38' and a female portion 40, 40' that accepts the male portion 38, 38'. The female portion 40, 40' is an indentation located on the nostril bridge support 26. The male portion 38, 38' is a projection situated on the inner frame 36. The detents 14, 14' securely attach the inner frame 36 to the eyeglass frame 16. Although not shown, the detents 14, 14' can also be Velcro™. Velcro™ has two opposing side, which adhere to each other.

The nostril bridge support 26 is divided into a left side 42 and a right side 44. One detent 14 is located on and to the left side 42 of the nostril bridge support 26. Another detent 14' is located on and to the right side 44 of the nostril bridge support 26. The female portion 40, 40' is located on the nostril bridge support 26. The male portion 38, 38' is positioned on the inner frame 36. The detent 14 is located adjacent to the first aperture 28, while the detent 14' is located adjacent to the second aperture 30.

Figure 3:
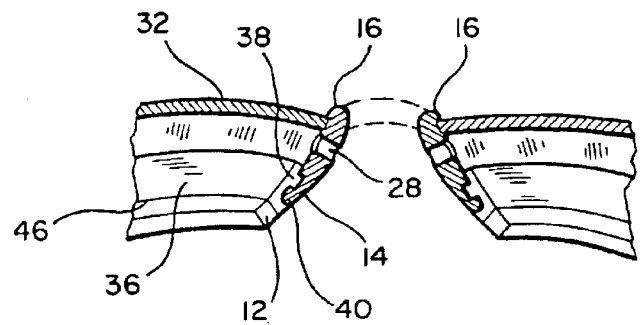
FIG. 3 is a cutaway perspective view of the area around the nostril bridge support.

Referring to FIGS. 3, 4 and 6, the inner frame 36 has a pad 12 that significantly reduces the wind from blowing on a person's eyes, while wearing the glasses. The pad 12 is positioned on the back surface 46 of the inner frame 36, so that the pad 12 can compress against the person's face. The pad 12 is foam or other soft pliable materials that are gentle and comfortable on the person's skin. The soft pliability of the foam allows the foam to conform to the shape of the person's face.

As shown in FIG. 6, the pad 12 has a thickness 't' that is between about one-sixteenth (1/16) inch and about one-half (1/2) inch. In a preferred embodiment the pad 12 has a thickness 't' that is about one-quarter (0.25) inch. The first aperture 28 and the second aperture 30 function best when combined with the pad 12. The pad 12 minimizes the airflow impacting the eyes from around the perimeter 48 of the ventilated glasses system 10. The first aperture 28 and the second aperture 30 allow some reduced speed airflow to circulate upon the interior surface 20. The reduced airflow is much gentler on the eyes, while still minimizing or eliminating accumulation of condensation.

Figure 2:
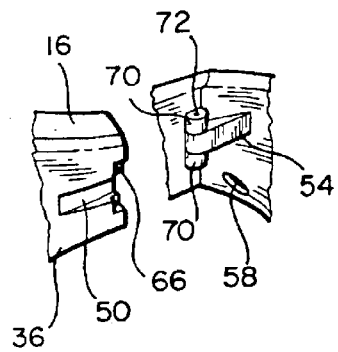
FIG. 2 is a partial side view of the first track and first ridge.

Referring to FIGS. 1, 2, 4 and 5 the inner frame 36 contains a first track 50 and a second track 52. The eyeglass frame 16 has a corresponding first ridge 54 and second ridge 56. FIG. 2 is a close up view of the first track 50 and the first ridge 54. The first track 50 accepts the first ridge 54 and the second track 52 accepts the second ridge 56. The inner frame 36 is thus guided into the proper positional alignment during attachment to the eyeglass frame 16. In conjunction with the detents 14, 14' a secure connection is provided between the inner frame 36 and the eyeglass frame 16. The first ridge 54 and the second ridge 56 are on the interior surface 20. The first ridge 54 is shown in dotted lines, since it is obscured in the backside perspective view of FIG. 5.

Referencing particularly FIGS. 2 and 4, the first track 50 has a first indent 66 that accepts a hinge protrusion 70. The hinge protrusion 70 is attached to the first ridge 54. Similarly, the second track 52 has a second indent 68 that accepts a hinge protrusion 70. A screw 72 projects through the center of the hinge protrusion 70.

Referring to FIGS. 1, 5 and 6, the eyeglass frame 16 is provided with a third aperture 58 and a fourth aperture 60 that are similar in function to the first aperture 28 and the second aperture 30. Air can flow through the third aperture 58 and the fourth aperture 60 thus removing condensation from the interior surface 20. The third aperture 58 is located adjacent to the left ear extension 22 and the fourth aperture 60 is located adjacent to the right ear extension 24.

The eyeglass frame 16 also includes a fifth aperture 62 and a sixth aperture 64 that provide additional airflow from the exterior surface 18 to the interior surface 20. The apertures are small in size to reduce the strength and speed of the airflow. Providing several apertures maintains sufficient airflow at a reduced speed to still remove condensation from the interior surface 20. The condensation does not accumulate on the interior surface 20 thus visibility is preserved. The nostril bridge support 26 is divided into the left side 42 and the right side 44. The first aperture 28 and fifth aperture 62 are positioned on the left side 42 of the nostril bridge support 26. The second aperture 30 and sixth aperture 64 are positioned on the right side 44. The first aperture 28 and fifth aperture remove condensation primarily from the left lens 32, while second aperture 30 and sixth aperture 64 remove condensation primarily from the right lens 34.

The left lens 32 and the right lens 34 are tinted for protection from the sun for the eyes. Although not shown, the ventilated glasses system can be provided with replacement lens. The left lens 32 or right lens 34 can be removed from the eyeglass frame 16, then a replacement lens 32, 34 can be snapped into place.

The ventilated glasses system 10 has several advantages. The strong airflow around the perimeter 48 of the ventilated glasses system 10 is significantly reduced by the pad 12. Irritation to the eyes is mitigated thus improving visibility and enhancing safety. Sufficient airflow is created by the addition of the apertures 28, 30 to reduce condensation upon the interior surface 20 of the eyeglass frame 16. The detents 14, 14' facilitate easy attachment and removal of the protective liner pad 12 from the eyeglass frame 16. Removal of the inner frame 36 and liner pad 12 when they are not desired, substantially decreases the weight of the glasses, thus increasing comfort for the person. The first track 50 is guided by the first ridge 54 so that the inner frame 36 is guided into the correct positional alignment with the eyeglass frame 16.

From the foregoing description in conjunction with the drawings, it is apparent that the present invention concerned with eyewear comprising an outer frame with outer and inner surfaces and an inner frame with outer and inner surfaces, and wherein the outer frame has a pair of lens-holding portions at opposite sides of a nostril bridge support, and a pair of ear extensions mounted on respective extremities of the outer frame remote from the nostril bridge support, and the inner frame has a nostril bridge support between portions of the inner frame that define openings disposed for alignment with respective lens-holding portions of the outer frame, and a pad of predetermined thickness disposed on the inner surface of the inner frame so as to extend across the nostril bridge support thereof and surround the openings of the inner frame. See FIGS. 1, 4, and 5, for example. As stated earlier, the pad has a predetermined thickness (e.g., between about 1-16th and about 1½ in.) and conforms to the shape of a wearer's face. As is apparent in FIGS. 1 and 6, the pad has a curvature, and the inner and outer frames have curvature that conforms to the curvature of the pad.

It is apparent from the earlier description in conjunction with the drawings that the inner frame is releasably attached to the outer frame, and that the outer surface of the inner frame is juxtaposed with the inner surface of the outer frame upon engagement of cooperable elements on the nostril bridge supports of the inner and outer frames and cooperable elements at the extremities of the outer frame and corresponding extremities of the inner frame. See, e.g., FIG. 6. As shown in FIG. 3, the female portion 40 accepts the male portion 38 when the inner frame 36 is attached to the eyeglass frame 16. FIGS. 1 and 4 show the male portions 38, 38' and FIGS. 1 and 5 show the female portions 40, 40' before the inner frame is attached to the eyeglass frame 16.

In an illustrative embodiment shown and described, the cooperable elements include detent elements and elements that guide the frames for alignment during attachment of the frames to one another. In the aforesaid embodiment, cooperable elements are provided on the nostril bridge supports of the inner and outer frames and cooperable elements are provided at the extremities of the outer frame and corresponding extremities of the inner frame. Also, as shown, e.g., in FIGS. 4 and 5, in the aforesaid embodiment the nostril bridge supports are bifurcated and the cooperable elements on the nostril bridge supports include male elements on the bifurcations of one of the nostril supports that cooperate with female elements on the bifurcations of the other nostril bridge support. More particularly, in the aforesaid embodiment the male elements are on the bifurcations of the nostril bridge support of the inner frame and the female elements are on the bifurcations of the nostril bridge support of the outer frame. The female elements are disposed on portions of the bifurcations of the nostril bridge support of the outer frame that face the ear extensions, as shown in FIG. 1. Furthermore, in the aforesaid embodiment the nostril bridge support of the outer frame is perforated for the flow of air between the outer surface and the inner surface of the outer frame, as by the provision of apertures that extend through the bifurcations. In the aforesaid embodiment, the eyewear is also perforated at positions other than the nostril bridge support, as by the provision of apertures at the extremities of the outer frame.

Although the present invention has been described in considerable detail with regard to the preferred versions thereof, other versions are possible. Therefore, the appended claims should not be limited to the descriptions of the preferred versions contained herein.

What is claimed is:

1. Eyewear comprising an outer frame with outer and inner surfaces and having a pair of lens-holding portions at opposite sides of a first nostril bridge support, and a pair of ear extensions mounted on respective extremities of the outer frame remote from the first nostril bridge support, the first nostril bridge support of the outer frame having perforations to allow the flow of air between the outer surface and the inner surface of the outer frame;

an inner frame having outer and inner surfaces, the inner frame having a second nostril bridge support between portions of the inner frame, said second nostril bridge support being disposed for alignment with respective lens-holding portions of the outer frame, a pad of predetermined thickness disposed on the inner surface of the inner frame so as to extend across the second nostril bridge support thereof and around the openings of the inner frame, the pad having a curvature so as to conform substantially to the face of a wearer and curvature of the inner and outer frames, and wherein the inner frame is releasably attached to the outer frame, with the outer surface of the inner frame juxtaposed with the inner surface of the outer frame, upon engagement of cooperable elements on the first and second nostril bridge supports of the outer and inner frames.

2. Eyewear according to claim 1, wherein the nostril bridge supports are bifurcated and the cooperable elements on the nostril bridge supports include male elements on the bifurcations of one of the nostril bridge supports that cooperate with female elements on the bifurcations of the other nostril bridge support.

3. Eyewear according to claim 2, wherein the male elements are on the bifurcations of the nostril bridge support of the inner frame and the female elements are on the bifurcations of the nostril bridge support of the outer frame.

4. Eyewear according to claim 3, wherein the female elements are disposed on portions of the bifurcations of the nostril bridge support of the outer frame that face the ear extensions.

5. Eyewear according to claim 1, wherein the cooperable elements include detent elements, and guide elements that assist in aligning the frames during attachment of the frames to one another.

6. Eyewear according to claim 1, wherein the thickness of the pad is about 0.25 in.

7. Eyewear according to claim 1, wherein the nostril bridge support of the outer frame is bifurcated, and the perforating of the nostril bridge support of the outer frame includes apertures that extend through the bifurcations.

8. Eyewear according to claim 1, wherein the eyewear is perforated at locations other than the nostril bridge support of the outer frame.

9. Eyewear according to claim 1, further including cooperable elements at the extremities of the outer frame and corresponding extremities of the inner frame for aiding the releasable attachment of the inner frame to the outer frame.

10. Eyewear comprising an outer frame with outer and inner surfaces and having a pair of lens-holding portions at opposite sides of a first nostril bridge support, and a pair of ear extensions mounted on respective extremities of the outer frame remote from the first nostril bridge support, the first nostril bridge support of the outer frame having perforations to allow the flow of air between the outer surface and the inner surface of the outer frame;

an inner frame having outer and inner surfaces, the inner frame having a second nostril bridge support between portions of the inner frame, said second nostril bridge support being disposed for alignment with respective lens-holding portions of the outer frame, a pad of predetermined thickness disposed on the inner surface of the inner frame so as to extend across the second nostril bridge support thereof and around the openings of the inner frame, the pad having a curvature so as to conform substantially to the face of a wearer and curvature of the inner and outer frames, and wherein the inner frame is releasably attached to the outer frame, with the outer surface of the inner frame juxtaposed with the inner surface of the outer frame, upon engagement of cooperable elements at the extremities of the outer frame and corresponding extremities of the inner frame.

11. Eyewear according to claim 10, wherein the nostril bridge supports are bifurcated and include cooperable male elements on the bifurcations of one of the nostril bridge supports that cooperate with female elements on the bifurcations of the other nostril bridge support.

12. Eyewear according to claim 11, wherein the male elements are on the bifurcations of the nostril bridge support of the inner frame and the female elements are on the bifurcations of the nostril bridge support of the outer frame.

13. Eyewear according to claim 11, wherein the female elements are disposed on portions of the bifurcations of the nostril bridge support of the outer frame that face the ear extensions.

14. Eyewear according to claim 10, wherein the cooperable elements on the extremities include detent elements, and guide elements that assist in aligning the frames during attachment of the frames to one another.

15. Eyewear according to claim 10, wherein the thickness of the pad is about 0.25 in.

16. Eyewear according to claim 10, wherein the nostril bridge support of the outer frame is bifurcated, and the nostril bridge support of the outer frame includes apertures that extend through the bifurcations.

17. Eyewear according to claim 10, wherein the eyewear is perforated at locations other than the nostril bridge support of the outer frame.

* * * * *